US008210589B2

(12) United States Patent  (10) Patent No.: US 8,210,589 B2
Penner et al.  (45) Date of Patent: Jul. 3, 2012

(54) VEHICLE CONSOLE ASSEMBLIES WITH CUP HOLDERS AND SPILL CONTROL FEATURES

(75) Inventors: Benjamin Warren Penner, Ann Arbor, MI (US); Chandan Chahande, Sterling Heights, MI (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 416 days.

(21) Appl. No.: 12/604,527

(22) Filed: Oct. 23, 2009

(65) Prior Publication Data

US 2011/0095555 A1  Apr. 28, 2011

(51) Int. Cl.
   *B60R 13/07* (2006.01)
   *B60R 7/04* (2006.01)
   *B60N 3/10* (2006.01)
(52) U.S. Cl. ............................. 296/24.34; 296/37.8
(58) Field of Classification Search ............... 296/24.34, 296/24.35, 37.1, 37.8, 37.12–37.15, 208; 224/926; 248/311.2
   See application file for complete search history.

(56) References Cited

U.S. PATENT DOCUMENTS

| | | | |
|---|---|---|---|
| 5,704,579 A | 1/1998 | Celentino et al. | |
| 5,706,170 A | 1/1998 | Glovatsky et al. | |
| 6,435,587 B1 * | 8/2002 | Flowerday et al. | 296/37.8 |
| 6,719,343 B2 * | 4/2004 | Emerling et al. | 296/24.34 |
| 6,851,736 B1 * | 2/2005 | Klopp et al. | 296/37.8 |
| 7,210,723 B2 | 5/2007 | Sugawara et al. | |
| 7,337,566 B2 * | 3/2008 | Inayoshi | 40/593 |
| 7,475,954 B1 * | 1/2009 | Latunski | 312/297 |
| 7,690,708 B2 * | 4/2010 | Lota et al. | 296/24.34 |
| 7,784,843 B2 * | 8/2010 | Lota et al. | 296/24.34 |
| 2003/0155787 A1 * | 8/2003 | Lein et al. | 296/24.1 |
| 2005/0035618 A1 * | 2/2005 | Toth et al. | 296/24.34 |
| 2006/0081750 A1 | 4/2006 | Kazyaka | |
| 2007/0232365 A1 | 10/2007 | Kogan | |
| 2007/0278829 A1 * | 12/2007 | Bell et al. | 296/193.11 |
| 2008/0113707 A1 | 5/2008 | Nesemeier et al. | |
| 2008/0163713 A1 | 7/2008 | Hessler | |
| 2011/0095555 A1 * | 4/2011 | Penner | 296/24.34 |
| 2011/0197697 A1 * | 8/2011 | Morrissett et al. | 74/473.24 |

FOREIGN PATENT DOCUMENTS

JP  02004314667 A  11/2004

* cited by examiner

Primary Examiner — Glenn Dayoan
Assistant Examiner — Gregory Blankenship
(74) Attorney, Agent, or Firm — Dinsmore & Shohl LLP

(57) ABSTRACT

A console assembly for a vehicle includes a housing including a front panel extending in a vertical direction. A cup holder assembly is in a cup holder-receiving volume within the housing. The cup holder-receiving volume is at least partially bounded by a partitioning panel having a horizontal portion extending toward the front panel. An interior panel is spaced rearward of the front panel. The interior panel extends in a vertical direction. An electrical component is mounted to at least one of the interior panel and the front panel and located between the interior panel and the front panel. A rib structure extends beyond the horizontal portion of the partitioning panel toward the front panel and that is located between the cup holder assembly and the electrical component. The rib structure is arranged and configured to direct liquid falling from the horizontal portion of the partitioning panel away from the electrical component.

20 Claims, 5 Drawing Sheets

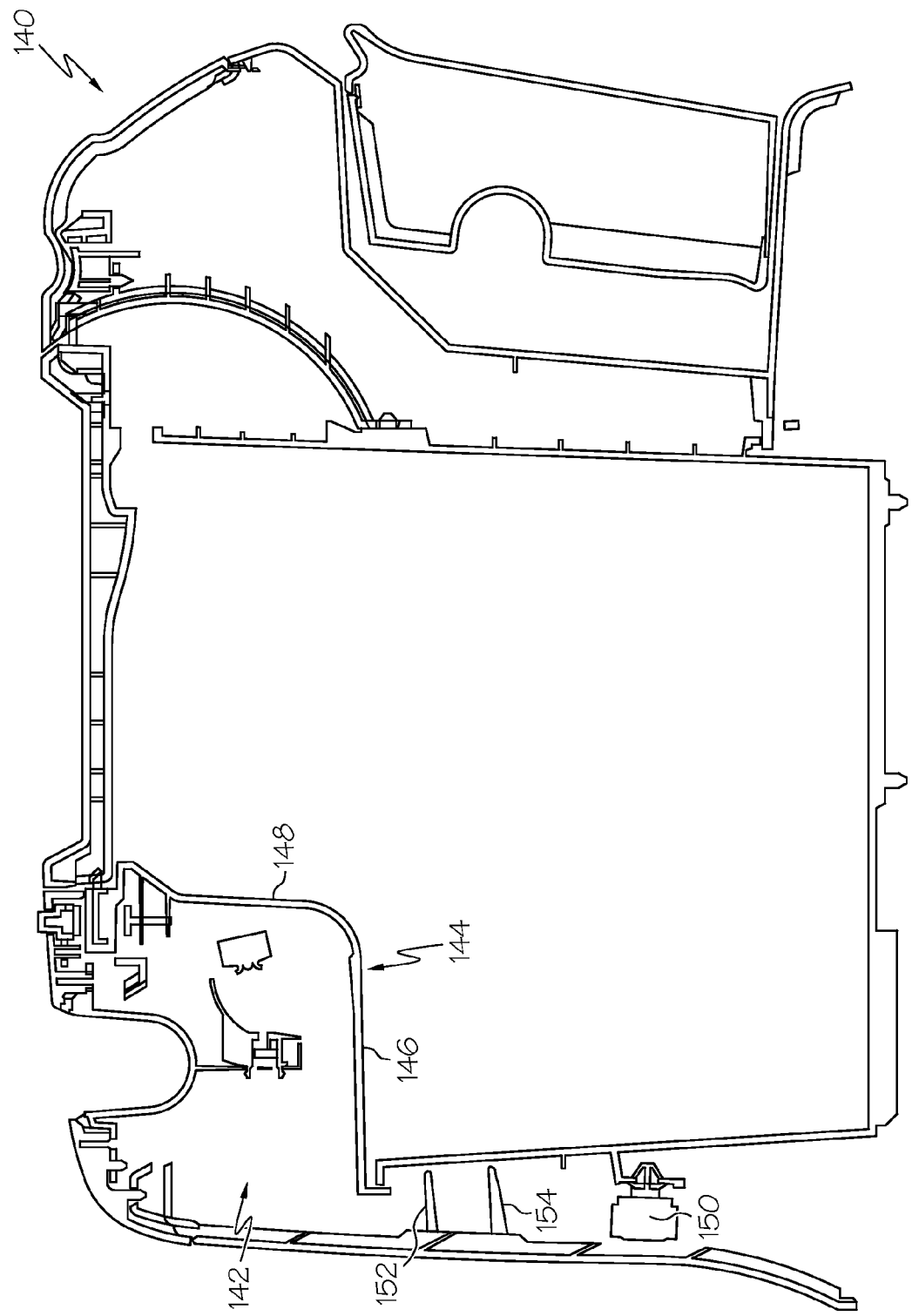

VEHICLE CONSOLE ASSEMBLIES WITH CUP HOLDERS AND SPILL CONTROL FEATURES

TECHNICAL FIELD

The present specification generally relates to vehicle console assemblies and, more specifically, to vehicle console assemblies with associated cup holders and spill control features.

BACKGROUND

Center consoles for vehicles come in many shapes and sizes and may contain any number of features. Some center consoles may include entertainment and/or climate system controls, auxiliary power outlets, and/or window controls. It is also not uncommon to provide a cup holder and/or storage bin in a center console.

While cup holders may generally be used to support cups in an upright position, it is not uncommon for liquid to spill from the cups. For example, a driver may slightly miss the cup holder, causing the cup to tilt, thereby spilling liquid from the cup onto the console. Liquid entering the console can come into contact with various electronic components located therein. Thus, it is desirable to control the flow path of fluids entering the console.

SUMMARY

In one embodiment, a console assembly for a vehicle includes a housing including a front panel extending in a vertical direction. A cup holder assembly is in a cup holder-receiving volume within the housing. The cup holder-receiving volume is at least partially bounded by a partitioning panel having a horizontal portion extending toward the front panel. An interior panel is spaced rearward of the front panel. The interior panel extends in a vertical direction. An electrical component is mounted to at least one of the interior panel and the front panel and located between the interior panel and the front panel. A rib structure extends beyond the horizontal portion of the partitioning panel toward the front panel and that is located between the cup holder assembly and the electrical component. The rib structure is arranged and configured to direct liquid falling from the horizontal portion of the partitioning panel away from the electrical component.

In another embodiment, an interior structure for a console assembly for directing liquid away from an electrical component within the console assembly includes an interior panel extending in a vertical direction that is spaced rearward from a front panel of the console assembly. A rib structure extends outwardly from the interior panel toward the front panel. The rib structure is located between a cup holder-receiving volume of the console assembly and an electrical component located below the cup holder-receiving volume. The rib structure overhangs the electrical component to direct liquid falling from the cup-holder receiving volume away from the electrical component.

In another embodiment, a console assembly for a vehicle includes a housing including a front panel extending in a vertical direction. A cup holder assembly is in a cup holder-receiving volume within the housing. The cup holder-receiving volume is at least partially bounded by a partitioning panel having a horizontal portion extending toward the front panel. The cup holder assembly includes at least one cup holder having an opening extending through a sidewall of the cup holder through which light may enter the cup holder for illuminating the cup holder. An interior panel is spaced rearward of the front panel. The interior panel extends in a vertical direction. An electrical connector is mounted to at least one of the interior panel and the front panel and located between the interior panel and the front panel. The electrical connector connects a lighting assembly for illuminating the cup holder to a power source. A rib structure extends beyond the horizontal portion of the partitioning panel toward the front panel and that is located between the cup holder assembly and the electrical connector. The rib structure is arranged and configured to direct liquid entering the cup holder-receiving volume through the opening extending through the sidewall of the cup holder away from the electrical connector.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 is a perspective view of another console assembly according to one or more embodiments shown and described herein.

DETAILED DESCRIPTION

Embodiments described herein generally relate to vehicle console assemblies including electronic components, such as vehicle lighting systems, and features for directing fluids away from the electronic components within the vehicle console assemblies. Such fluid directing features can reduce the possibility of electrical shortages, for example, due to fluid spillage onto the console assemblies. Various embodiments of the console assemblies and fluid directing features will be described in more detail herein.

Figure 1:
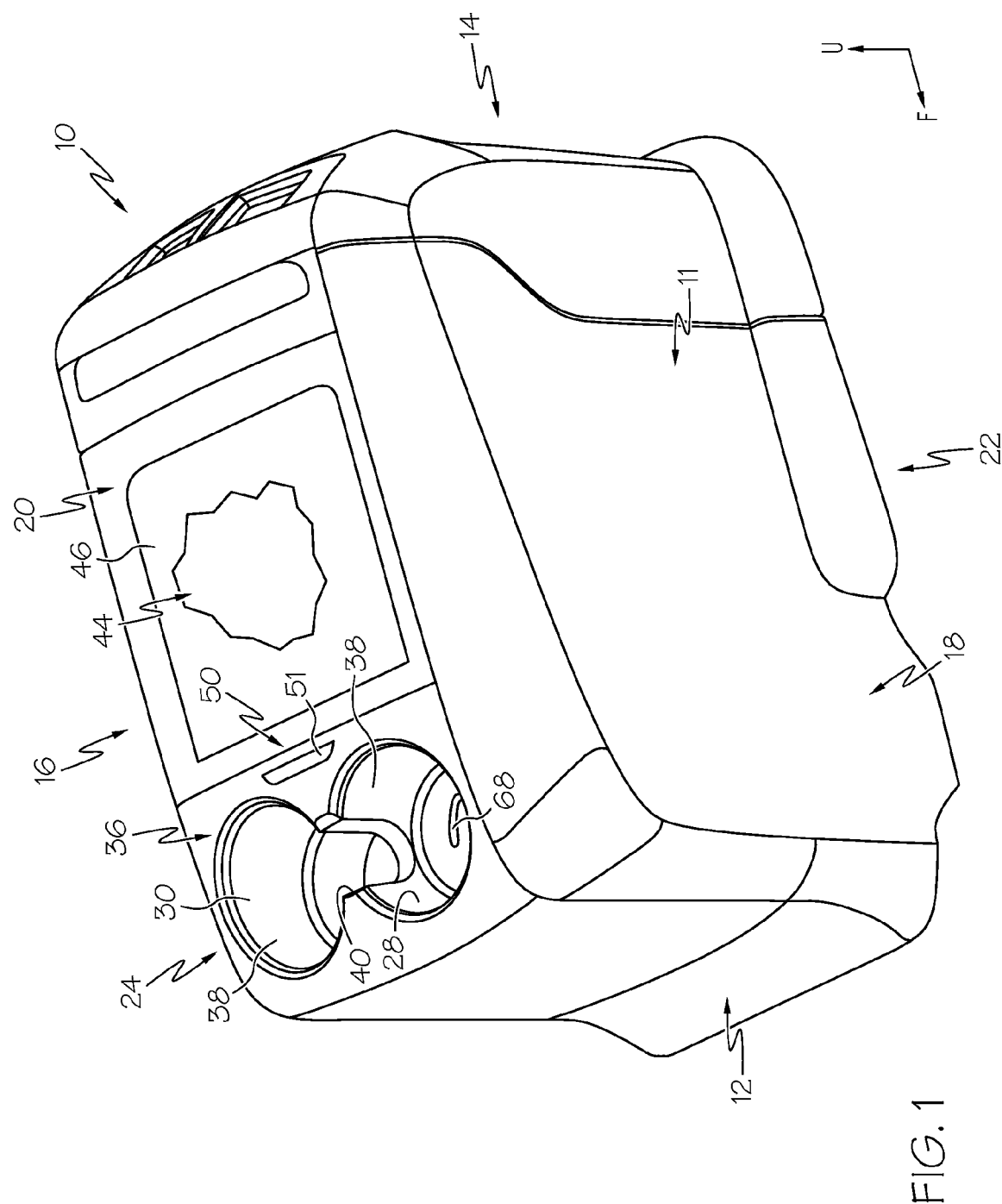
FIG. 1 is a perspective view of a console assembly according to one or more embodiments shown and described herein.

FIG. 1 generally depicts one exemplary embodiment of a console assembly 10 for a vehicle where arrows F and U denote forward and upward directions of the vehicle. The console assembly 10 has a generally box-shaped housing 11 and includes a front 12 facing forward, a rear 14 facing rearward, sides 16 and 18 facing widthwise outward, a top 20 facing upward and a bottom 22 facing downward. The console assembly 10 may be located at any suitable position within a vehicle, such as between front seats, between rear seats, etc. The console assembly 10 may be used with any suitable vehicle, such as automobiles, airplanes, boats, etc. In one embodiment, the console assembly 10 is a center console assembly that is located between seats of an automobile. For example, the console assembly 10 may be located between front seats of an automobile.

A cup holder assembly 24 is located at the top 20 of the console assembly 10. Cup holder assembly 24 is located nearer the front 12 and includes cup holders 28 and 30 located side-by-side and extending toward the bottom 22 of the console assembly 10. Each cup holder 28 and 30 may generally include an upward facing opening 36 sized to receive a bottom portion of a cup and a downwardly extending sidewall 38 forming cup-receiving volumes that can be used to hold a cup therein. A recess 40 may be provided between cup holders 28 and 30. The recess 40 may provide for storage of travel mugs and cups with handles and increased accessibility to the travel mugs and cups located within the cup holders 28 and 30.

A storage bin 44 may be located rearward of the cup holder assembly 24. A door 46 has an open position and a closed position for providing access to the storage bin 44 through an access opening. A release mechanism (generally referred to as element 50) may be provided for latching and unlatching the door 46. A button 51 or other suitable unlatching device may be provided for controlling the release mechanism 50. In some embodiments, the door 46 may be biased (e.g., using a spring) toward the open position. In another embodiment, the door 46 may be openable manually.

Figure 2:
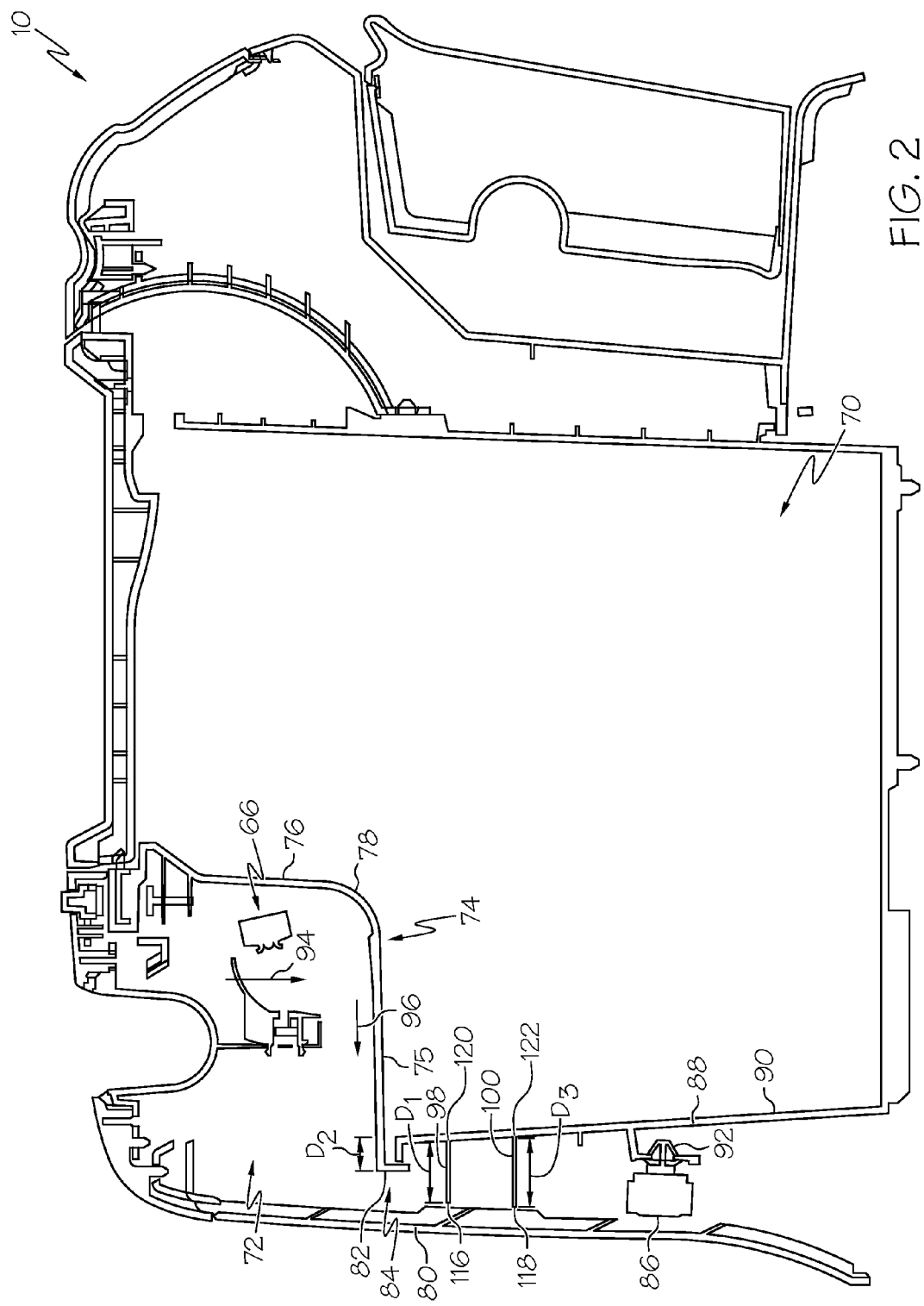
FIG. 2 is a section view of the console assembly of FIG. 1 according to one or more embodiments shown and described herein.

The console assembly 10 may include a lighting system 66 for illuminating areas within the console assembly 10 (FIG. 2). The lighting system 66 may be used to light the cup holder assembly 24 and the storage bin 44. In the illustrated embodiment, the lighting system 66 may be used to illuminate the cup holder assembly 24 including both cup holders 28 and 30 and the storage bin 44. An exemplary lighting system for illuminating the cup holders 28 and 30 and the storage bin 44 is described in U.S. patent application Ser. No. 12/542,227, filed Aug. 17, 2009, entitled "Vehicle Console Assemblies with Associated Vehicle Lighting Systems for Illuminating Cup Holder and Storage Bin Assemblies," the details of which are hereby incorporated by reference in their entirety.

In some embodiments, one or both of the cup holders 28 and 30 may not be fluid-tight. For example, the cup holder 28 of FIG. 1 shows an opening 68 in the sidewall 38 that frames a window through which light may pass from a light source to the cup holder 28. Cup holder 30 may include the same opening 68. The opening 68 may provide an escape route for liquid spilled into the cup holder 28.

Referring to FIG. 2, an interior 70 of the console assembly 10 includes a cup holder receiving volume 72 that receives the cup holders 28 and 30. A partitioning panel 74 bounds a portion of the cup holder receiving volume 72 with a horizontal portion 75 and a vertical portion 76 connected by a bend 78. The horizontal portion 75 extends outwardly from the bend 78 toward a front panel 80. As can be seen, the horizontal portion 75 terminates at an end 82 that is spaced from the front panel 80 leaving a gap 84 between the front panel 80 and the horizontal portion 75.

An electrical component 86 is located beneath the horizontal portion 75, attached to a sidewall 88 of interior panel 90. In some embodiments, the electrical component 86 may be a wire harness connector connecting electronics of the console assembly 10 (e.g., LED, power outlets, video jacks, etc.) to a main power line running through the vehicle. The electrical component 86 may be connected to the interior panel 90 using any suitable means, such as using fastener 92.

Figure 3:
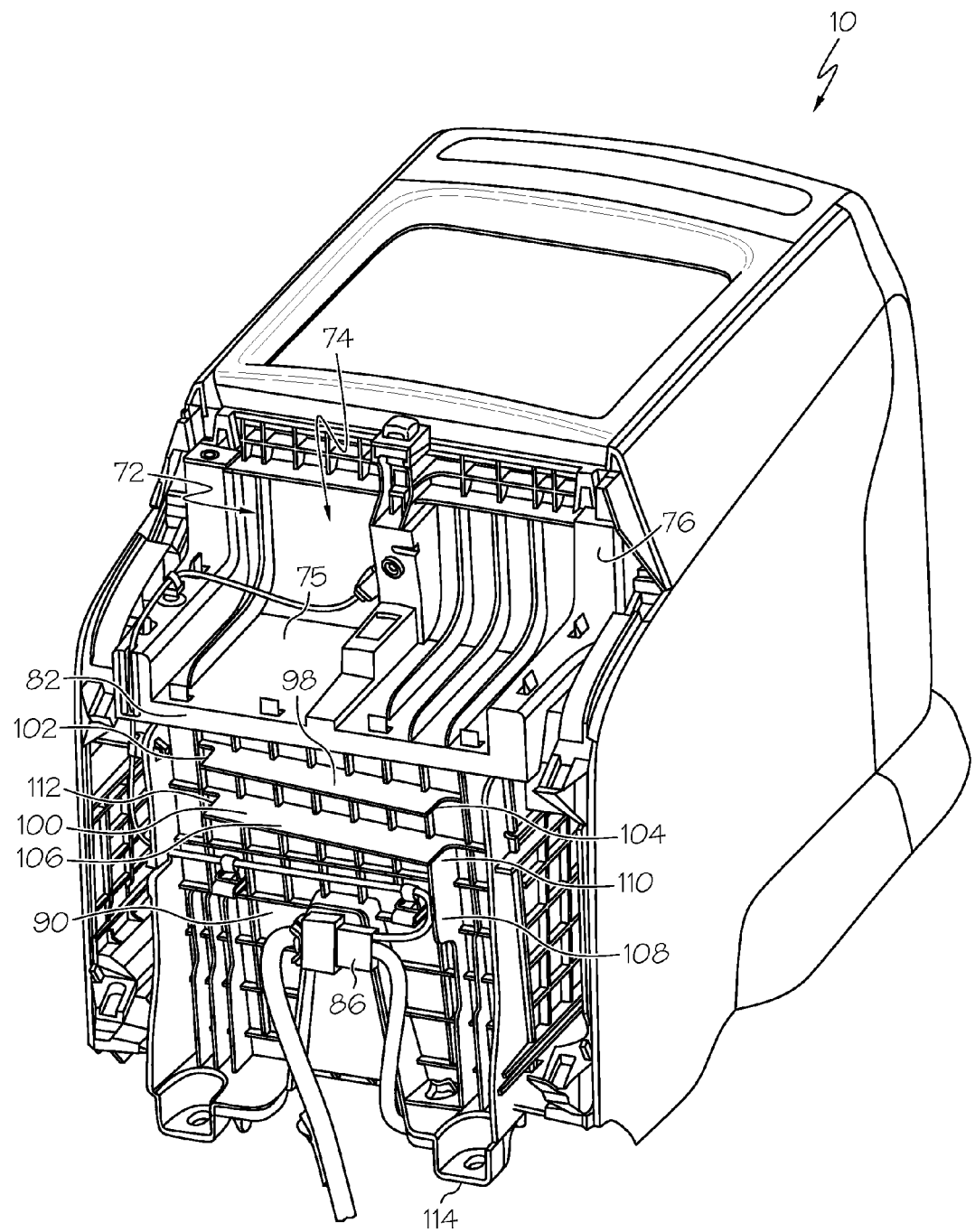
FIG. 3 is a perspective view of an interior of the console assembly of FIG. 1 according to one or more embodiments shown and described herein.

Because the cup holders 28 and 30 may not be liquid-tight, a possible leak path indicated by arrows 94 and 96 may be provided where liquid spilled into the cup holders 28 and 30 may travel toward the electrical component 86. Referring also to FIG. 3, an upper rib structure 98 and a lower rib structure 100 are provided for diverting liquid passing through the gap 84. Rib structure 98 extends horizontally and may extend at a downward angle (e.g., of about five degrees to the horizontal) from a first end 102 to a second end 104. Rib structure 100 has a horizontal portion 106 and a vertical portion 108 that are connected by a corner 110. The horizontal portion 106 extends horizontally and may extend at a downward angle (e.g., about 5 degrees to the horizontal) from an end 112 to the corner 110. Vertical portion 108 extends downwardly to a bottom 114. Referring particularly to FIG. 2, the rib structure 98 extends outwardly from the interior panel 90 a distance $D_1$ greater than a distance $D_2$ that the horizontal portion 75 extends from the interior panel 90 toward the front panel 80. While the rib structures 98 and 100 are illustrated in FIG. 2 as being relatively horizontal in cross-section, they may extend outwardly at an angle to the horizontal such that outer edges 116 and 118 of the rib structures 89 and 100 are elevated with respect to opposite edges 120 and 122 that are integrally connected with the interior panel 90.

In some embodiments, the interior panel 90 extends rearward at an angle to the vertical. In some of these embodiments, the rib structure 100 may extend outwardly from the interior panel 90 a distance $D_3$ greater than distances $D_1$ and $D_2$. In one embodiment, the distance $D_3$ may be selected such that the outer edges 116 and 118 of the rib structures 98 and 100 are aligned along a vertical line. In other embodiments, the outer edges 116 and 118 may be offset such that one edge 116 or 118 extends outwardly further than the other edge 116 or 118. For example, in the embodiment of FIG. 2, the front panel 80 may be angled frontward with respect to the vertical. In these embodiments, the $D_3$ may be greater than $D_1$ to locate the outer edge 118 near to the front panel 80. In some embodiments, $D_1$ and $D_3$ of the rib structures 98 and 100 may be selected to maintain a preselected spacing between the rib structures 98 and 100 and the front panel 80. In many embodiments, gaps between the outer edges 116 and 118 and the front panel 80 may have a width less than gap 84.

Figure 4:
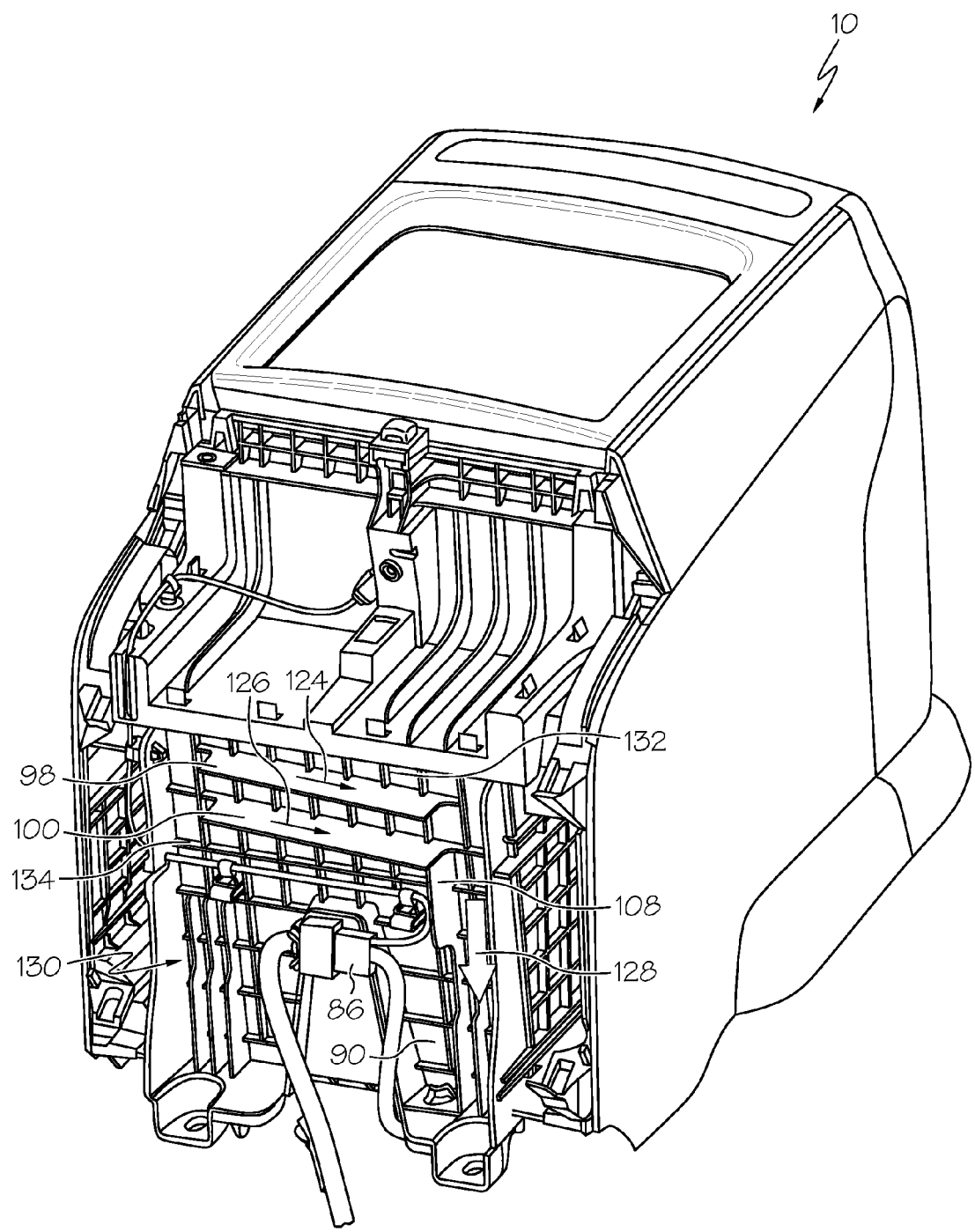
FIG. 4 is a perspective view of the interior of FIG. 3 illustrating operation of features for directing liquids away from electrical components according to one or more embodiments shown and described herein.

Referring to FIG. 4, the rib structures 98 and 100 operate by directing liquid leaking into the console assembly 10 away from the electrical component 86. As represented by the arrows 124 and 126, the rib structures 98 and 100 are shaped such that the liquid flows down the widths of the rib structures 98 and 100 toward the vertical portion 108 of the rib structure 100. The liquid then flows vertically, as represented by arrow 128 toward the floor of the vehicle. The console assembly 10 may be open to the floor such that the liquid escapes the console assembly 10 and flows to the floor, for example, rather than accumulating within the console assembly 10.

The rib structures 98 and 100 may be formed by any suitable method, such as during a plastic (e.g., polypropylene) molding process of the interior panel 90. In the illustrated embodiment, the rib structures 98 and 100 may be formed as part of a rib matrix 130 formed by a plurality of horizontal and vertically extending strengthening ribs (e.g., see ribs 132 and 134). The strengthening ribs 132 and 134 may extend outwardly from the interior panel 90 a distance less than the distances $D_1$ and/or $D_2$. The vertically extending strengthening ribs 132 may intersect one or both of the rib structures 98 and 100. However, the vertically extending strengthening ribs 132 may terminate at a location spaced from the outer edges 116 and 118 of the rib structures 98 and 100 thereby providing an unobstructed path for the liquid to flow away from the electrical component 86.

Referring now to FIG. 5, another console assembly embodiment 140 may include many of the features described above including a cup holder receiving volume 142, partitioning panel 144 with horizontal portion 146 and vertical portion 148 and electrical component 150. In this embodiment, rib structures 152 and 154 extend outwardly from a front panel 156 toward an interior panel 158. Other variations are contemplated.

The above-described rib structures can inhibit liquid from contacting electrical components of the console assembly, thereby inhibiting electrical malfunction. The rib structures may provide increased strength for the console assembly and may allow for increased freedom in selection of electrical components. For example, some electrical components may provide water resistance, however, these water resistant electrical components may be more expensive. Thus, the above-described rib structures may allow for selection less expensive electrical components. For example, the electrical component may not be water resistant. However, the rib structures direct liquid flowing into the console assembly through the cup holders away from the electrical component, as described above. While two rib structures are illustrated above, there may be more or less than two rib structures.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A console assembly for a vehicle comprising:
   a housing including a front panel extending in a vertical direction;
   a cup holder assembly in a cup holder-receiving volume within the housing, the cup holder-receiving volume being at least partially bounded by a partitioning panel having a horizontal portion extending toward the front panel;
   an interior panel spaced rearward of the front panel, the interior panel extending in a vertical direction;
   an electrical component mounted to at least one of the interior panel and the front panel and located between the interior panel and the front panel; and
   a rib structure that extends beyond the horizontal portion of the partitioning panel toward the front panel and that is located between the cup holder assembly and the electrical component, the rib structure arranged and configured to direct liquid falling from the horizontal portion of the partitioning panel away from the electrical component.

2. The console assembly of claim 1, wherein the partitioning panel includes a vertical portion extending upwardly from the horizontal portion toward a top of the housing.

3. The console assembly of claim 1, wherein the rib structure includes a horizontal portion and a vertical portion extending downwardly from the horizontal portion.

4. The console assembly of claim 3, wherein both the horizontal portion and the vertical portion of the rib structure extend outwardly beyond the horizontal portion of the partitioning panel toward the front panel.

5. The console assembly of claim 1, wherein the rib structure is a first rib structure, the console assembly further comprising a second rib structure located below the first rib structure, the second rib structure extending beyond the horizontal portion of the partitioning panel toward the front panel and being located between the cup holder assembly and the electrical component.

6. The console assembly of claim 5, wherein the second rib structure includes a horizontal portion and a vertical portion extending downwardly from the horizontal portion.

7. The console assembly of claim 6, wherein both the horizontal portion and the vertical portion of the second rib structure extend outwardly beyond the horizontal portion of the partitioning panel toward the front panel.

8. The console assembly of claim 1, wherein the rib structure is formed integrally with the interior panel.

9. The console assembly of claim 1, wherein the rib structure extends in a widthwise direction at an angle to the horizontal.

10. An interior structure for a console assembly for directing liquid away from an electrical component within the console assembly, the interior structure comprising:
    an interior panel extending in a vertical direction that is spaced rearward from a front panel of the console assembly; and
    a rib structure that extends outwardly from the interior panel toward the front panel, the rib structure being located between a cup holder-receiving volume of the console assembly and an electrical component located below the cup holder-receiving volume, the rib structure overhanging the electrical component to direct liquid falling from the cup-holder receiving volume away from the electrical component.

11. The interior structure of claim 10, wherein the rib structure includes a horizontal portion and a vertical portion extending downwardly from the horizontal portion.

12. The interior structure of claim 11, wherein both the horizontal portion and the vertical portion of the rib structure extend outwardly beyond a horizontal portion of a partitioning panel toward the front panel, the partitioning panel at least partially bounding the cup holder-receiving volume.

13. The interior structure of claim 12, wherein the rib structure is a first rib structure, the console assembly further comprising a second rib structure located above the first rib structure, the second rib structure extending beyond the horizontal portion of the partitioning panel toward the front panel and being located between the cup holder-receiving volume and the electrical component.

14. The interior structure of claim 10, wherein the rib structure is formed integrally with the interior panel.

15. The interior structure of claim 10, wherein the rib structure extends in a widthwise direction at an angle to the horizontal.

16. A console assembly for a vehicle comprising:
    a housing including a front panel extending in a vertical direction;
    a cup holder assembly in a cup holder-receiving volume within the housing, the cup holder-receiving volume being at least partially bounded by a partitioning panel having a horizontal portion extending toward the front panel, the cup holder assembly including at least one cup holder having an opening extending through a sidewall of the cup holder through which light may enter the cup holder for illuminating the cup holder;

an interior panel spaced rearward of the front panel, the interior panel extending in a vertical direction;

an electrical connector mounted to at least one of the interior panel and the front panel and located between the interior panel and the front panel, the electrical connector connecting a lighting assembly for illuminating the cup holder to a power source; and a rib structure that extends beyond the horizontal portion of the partitioning panel toward the front panel and that is located between the cup holder assembly and the electrical connector, the rib structure arranged and configured to direct liquid entering the cup holder-receiving volume through the opening extending through the sidewall of the cup holder away from the electrical connector.

17. The console assembly of claim 16, wherein the rib structure includes a horizontal portion and a vertical portion extending downwardly from the horizontal portion.

18. The console assembly of claim 17, wherein both the horizontal portion and the vertical portion of the rib structure extend outwardly beyond the horizontal portion of the partitioning panel toward the front panel.

19. The console assembly of claim 16, wherein the rib structure is a first rib structure, the console assembly further comprising a second rib structure located below the first rib structure, the second rib structure extending beyond the horizontal portion of the partitioning panel toward the front panel and being located between the cup holder assembly and the electrical connector, wherein the second rib structure includes a horizontal portion and a vertical portion extending downwardly from the horizontal portion.

20. The console assembly of claim 19, wherein both the horizontal portion and the vertical portion of the second rib structure extend outwardly beyond the horizontal portion of the partitioning panel toward the front panel.

* * * * *